United States Patent
Spink et al.

(10) Patent No.: US 8,885,673 B2
(45) Date of Patent: *Nov. 11, 2014

(54) INTERLEAVING DATA PACKETS IN A PACKET-BASED COMMUNICATION SYSTEM

(71) Applicant: Intel Corporation, Santa Clara, CA (US)

(72) Inventors: Aaron T. Spink, San Francisco, CA (US); Herbert H. J. Hum, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/676,891

(22) Filed: Nov. 14, 2012

(65) Prior Publication Data

US 2013/0070779 A1    Mar. 21, 2013

Related U.S. Application Data

(63) Continuation of application No. 11/211,063, filed on Aug. 24, 2005, now Pat. No. 8,325,768.

(51) Int. Cl.
*H04J 3/04* (2006.01)
*H04L 12/883* (2013.01)
*H04L 12/861* (2013.01)
*H04L 12/66* (2006.01)

(52) U.S. Cl.
CPC ........ *H04L 49/9057* (2013.01); *H04L 49/9021* (2013.01); *H04L 49/9042* (2013.01); *H04L 49/9094* (2013.01); *H04L 12/66* (2013.01)

USPC ............ 370/535; 370/381; 370/363; 370/431

(58) Field of Classification Search
CPC ............ H04L 49/9042; H04L 49/9094; H04L 49/9021
USPC .................................. 370/535, 381, 363, 431
See application file for complete search history.

(56) References Cited

U.S. PATENT DOCUMENTS

| 4,542,380 | A | | 9/1985 | Beckner et al. |
| 5,303,302 | A | * | 4/1994 | Burrows ....................... 713/161 |

(Continued)

FOREIGN PATENT DOCUMENTS

JP    61241843 A    10/1986

OTHER PUBLICATIONS

PCI Express Base Specification Revision 1, Jul. 22, 2002, 423 pages.

(Continued)

*Primary Examiner* — Ricky Ngo
*Assistant Examiner* — Dewanda Samuel
(74) *Attorney, Agent, or Firm* — Trop, Pruner & Hu, P.C.

(57) ABSTRACT

In one embodiment, the present invention includes a method for receiving a first portion of a first packet at a first agent and determining whether the first portion is an interleaved portion based on a value of an interleave indicator. The interleave indicator may be sent as part of the first portion. In such manner, interleaved packets may be sent within transmission of another packet, such as a lengthy data packet, providing improved processing capabilities. Other embodiments are described and claimed.

20 Claims, 5 Drawing Sheets

(56) References Cited

U.S. PATENT DOCUMENTS

| | | | |
|---|---|---|---|
| 5,343,473 A | 8/1994 | Cidon et al. | |
| 5,406,504 A * | 4/1995 | Denisco et al. | 702/117 |
| 5,440,752 A * | 8/1995 | Lentz et al. | 710/123 |
| 5,557,608 A | 9/1996 | Calvignac et al. | |
| 5,781,774 A * | 7/1998 | Krick | 713/1 |
| 5,838,985 A * | 11/1998 | Ohki | 712/16 |
| 5,895,487 A * | 4/1999 | Boyd et al. | 711/122 |
| 5,956,729 A | 9/1999 | Goetz et al. | |
| 5,960,455 A * | 9/1999 | Bauman | 711/120 |
| 6,009,488 A | 12/1999 | Kavipurapu | 710/105 |
| 6,209,079 B1 | 3/2001 | Otani et al. | |
| 6,311,258 B1 * | 10/2001 | Gibson et al. | 711/200 |
| 6,460,080 B1 | 10/2002 | Shah et al. | 709/244 |
| 6,493,402 B1 | 12/2002 | Fimoff | |
| 6,516,375 B1 | 2/2003 | Ajanovic | |
| 6,615,319 B2 | 9/2003 | Khare | |
| 6,628,615 B1 * | 9/2003 | Joseph et al. | 370/231 |
| 6,629,219 B1 * | 9/2003 | Manseau | 711/157 |
| 6,633,564 B1 | 10/2003 | Steer et al. | |
| 6,683,884 B1 | 1/2004 | Howard | 370/412 |
| 6,724,721 B1 | 4/2004 | Cheriton | |
| 6,754,209 B1 | 6/2004 | Stachura | |
| 6,772,251 B1 | 8/2004 | Hastings | |
| 6,842,827 B2 | 1/2005 | Blankenship | |
| 6,888,843 B2 | 5/2005 | Keller | |
| 6,889,284 B1 | 5/2005 | Nizar | |
| 6,891,855 B2 | 5/2005 | Bruckman | |
| 6,901,049 B1 | 5/2005 | Chapman | |
| 6,912,251 B1 | 6/2005 | Ward et al. | |
| 6,912,612 B2 | 6/2005 | Kapur | |
| 6,996,100 B1 | 2/2006 | Haartsen | |
| 7,047,374 B2 | 5/2006 | Sah | |
| 7,050,410 B1 | 5/2006 | Kim | |
| 7,123,621 B1 | 10/2006 | Niida et al. | |
| 7,142,540 B2 | 11/2006 | Hendel et al. | |
| 7,203,775 B2 | 4/2007 | Van Doren | |
| 7,218,638 B2 * | 5/2007 | Moll | 370/395.4 |
| 7,225,300 B1 * | 5/2007 | Choquette et al. | 711/146 |
| 7,245,613 B1 | 7/2007 | Winkles et al. | |
| 7,248,596 B2 | 7/2007 | Shimizu | |
| 7,318,114 B1 | 1/2008 | Cypher | |
| 7,321,596 B2 | 1/2008 | Ohnishi | |
| 7,395,483 B1 | 7/2008 | Tourancheau | |
| 7,461,218 B2 | 12/2008 | Muthrasanallur | |
| 7,558,954 B2 | 7/2009 | Apostolopoulos et al. | |
| 7,698,478 B2 | 4/2010 | Wang et al. | |
| 7,949,794 B2 | 5/2011 | Ajanovic et al. | |
| 2001/0013080 A1 | 8/2001 | Kameyama | |
| 2002/0044560 A1 * | 4/2002 | Dally et al. | 370/401 |
| 2002/0049901 A1 | 4/2002 | Carvey | |
| 2003/0093631 A1 | 5/2003 | Osborne | |
| 2003/0110422 A1 | 6/2003 | Naffziger | |
| 2003/0128705 A1 | 7/2003 | Yi et al. | |
| 2003/0163649 A1 | 8/2003 | Kapur | |
| 2003/0177313 A1 * | 9/2003 | Iyer et al. | 711/129 |
| 2003/0177320 A1 | 9/2003 | Sah | |
| 2004/0022094 A1 | 2/2004 | Radhakrishnan | |
| 2004/0114609 A1 | 6/2004 | Swarbrick | |
| 2004/0160970 A1 | 8/2004 | Dally | |
| 2005/0018609 A1 | 1/2005 | Dally | |
| 2005/0088967 A1 | 4/2005 | Cen | 370/228 |
| 2005/0172091 A1 * | 8/2005 | Rotithor et al. | 711/157 |
| 2005/0216638 A1 * | 9/2005 | Smith et al. | 710/305 |
| 2005/0251599 A1 | 11/2005 | Hum et al. | 710/100 |
| 2005/0251611 A1 | 11/2005 | Creta et al. | 710/316 |
| 2005/0251612 A1 | 11/2005 | Creta et al. | 710/316 |
| 2005/0259696 A1 | 11/2005 | Steinman | |
| 2008/0140909 A1 | 6/2008 | Flynn | |
| 2009/0323547 A1 | 12/2009 | Caesar et al. | |

OTHER PUBLICATIONS

"PCI Express and Advanced Switching: Evolutionary Path to Building Next Generation Interconnects". David Maythew and Krishnan. Proceedings of the 11$^{th}$ Symposium on High Performance Interconnects, Aug. 20-22, 2003.

U.S. Appl. No. 11/211,046, filed Aug. 24, 2005, entitled "Buffering Data Packets According to Multiple Flow Control Schemes" by Aaron T. Sink and Herbert H.J. Hum.

* cited by examiner

INTERLEAVING DATA PACKETS IN A PACKET-BASED COMMUNICATION SYSTEM

This application is a continuation of U.S. patent application Ser. No. 11/211,063, filed Aug. 24, 2005, the content of which is hereby incorporated by reference.

BACKGROUND

Embodiments of the present invention relate to data communication, and more particularly to packet-based communication.

Most computer systems are formed of components coupled together using one or more buses, which are used to transmit information between the various system components. Present bus standards such as the Peripheral Component Interconnect (PCI) Specification, Rev. 2.1 (published Jun. 1, 1995) provide a multi-drop bus in which multiple devices are coupled to the same bus. Accordingly, it is easy to read or write to devices on the same bus.

However, as bus interface speeds increase, bus architectures are moving away from multi-drop architectures towards point-to-point architectures. In point-to-point architectures, peer-to-peer communication becomes more difficult as synchronization, ordering, and coherency of such communications becomes more difficult. One example of a point-to-point architecture is a PCI Express™ architecture in accordance with the PCI Express Base Specification, Rev. 1.0 (published Jul. 22, 2002).

Communication between serially connected devices typically involves buffering data to be sent in a transmitting device and then sending the data in a packetized form to a receiving device. Typically, an entire first packet is sent before a next packet can begin transmission. However, some systems provide for interleaving of multiple packets. Typically to handle such interleaving, a sideband channel is used to communicate information regarding the interleaving, including the channel used for interleaving, the length of the interleaving and so forth. Use of sideband resources negatively affects system performance and complicates packet interleaving. Accordingly, a need exists for improved packet interleaving.

DETAILED DESCRIPTION

Figure 1:
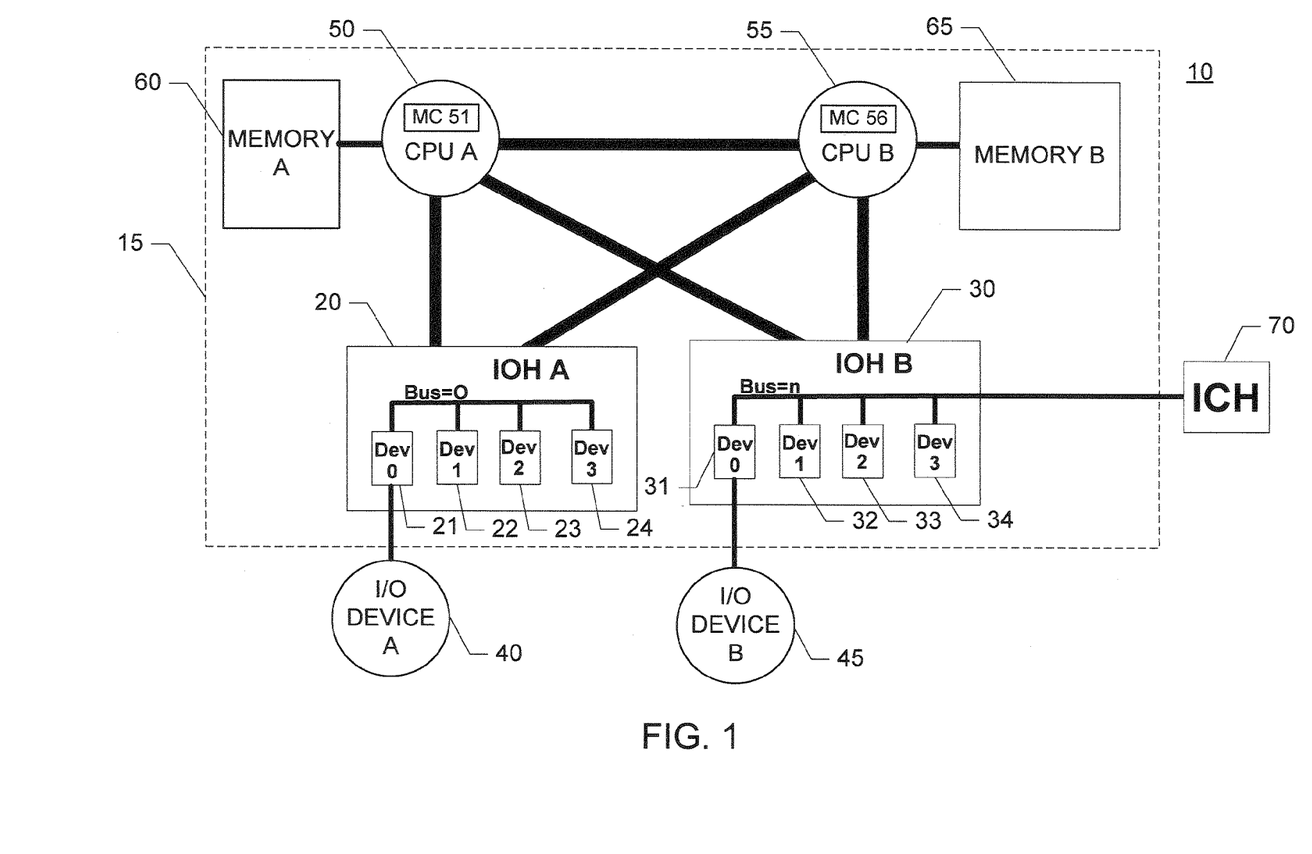
FIG. 1 is a block diagram of a system in accordance with one embodiment of the present invention.

Referring to FIG. 1, shown is a block diagram of a system in accordance with one embodiment of the present invention. As shown in FIG. 1, system 10 may be a multiprocessor system including a coherent interface in accordance with an embodiment of the present invention. That is, system 10 may represent any one of a desired desktop, mobile, server or other such platform, in different embodiments. In certain embodiments, interconnections between different components of FIG. 1 may be point-to-point interconnects that provide for coherent shared memory within system 10, and in one such embodiment the interconnects and protocols used to communicate therebetween may form a coherent system. In such manner, multiple processors, memories, and other components of system 10 may coherently interface with each other.

Referring to FIG. 1, system 10 may include a first processor 50 (CPU A) and a second processor 55 (CPU B). In various embodiments, each processor may include memory controller functionality such that the processors may directly interface with an associated shared memory via a point-to-point interconnect. For example, as shown in FIG. 1, processor 50 may be coupled to a memory 60 (memory A) via a point-to-point interconnect and processor 55 may be coupled to a memory 65 (memory B) via a similar point-to-point interconnect. More so, processors 50 and 55 may be coupled to each other via a point-to-point interconnect. Similarly, each of processors 50 and 55 may be coupled via point-to-point interconnects to each of a first input/output (I/O) hub (IOH A) 20 and a second IOH 30 (IOH B).

In the embodiment of FIG. 1, all components within box 15 may collectively form a coherent system (i.e., coherent system 15). Such a coherent system may accommodate coherent transactions without any ordering between channels through which transactions flow. While discussed herein as a coherent system, it is to be understood that both coherent and non-coherent transactions may be passed through and acted upon by components within the system. For example, a region of one or both of memories 60 and 65 may be reserved for non-coherent transactions. While the embodiment of FIG. 1 shows a platform topology having two processors and two I/O hubs, it is to be understood that other embodiments may include more or fewer such components. For example, a single processor system may be implemented having a single processor, a single I/O hub and associated I/O devices coupled thereto. Alternately, a multiprocessor system having 4, 8, 16, 32 or another number of processors may be implemented, and an appropriate number of I/O hubs and other components may be coupled thereto. Any such platform topologies may take advantage of point-to-point interconnections to provide for coherency within a coherent portion of the system, and also permit non-coherent peer-to-peer transactions between I/O devices coupled thereto. Such point-to-point interconnects may thus provide multiple paths between components.

As shown in FIG. 1, I/O hubs 20 and 30 may each include a plurality of ports (e.g., ports 21-24 in IOH 20 and ports 31-34 in IOH 30) to interface with I/O devices coupled thereto. For example, in certain embodiments, such I/O devices may be devices in accordance with one or more bus schemes. In one embodiment, such I/O devices may be PCI Express™ devices. For simplicity, FIG. 1 shows a single I/O device coupled to each I/O hub, namely I/O device (I/O device A) 40 coupled via port 21 to IOH 20 and I/O device (I/O device B) 45 coupled via port 31 to IOH 30. It is to be understood that the number of ports in an I/O hub in accordance with an embodiment of the present invention may vary, and the number of ports and devices coupled thereto shown in FIG. 1 are for illustrative purposes only.

Also shown in FIG. 1 is a legacy I/O controller hub (ICH) 70 coupled to IOH 30. In one embodiment, ICH 70 may be used to couple legacy devices such as a keyboard, mouse, and Universal Serial Bus (USB) devices (e.g., devices in accordance with the USB Specification Rev. 2.0 (published December 2000)) to coherent system 15.

While the I/O hubs shown in FIG. 1 include a plurality of ports, it is to be understood that the hubs may realize various functions using a combination of hardware, firmware and software. Such hardware, firmware, and software may be used so that the I/O hub may act as an interface between coherent system 15 (e.g., shared memories 60 and 65, processors 50 and 55, and IOHs 20 and 30), and devices coupled thereto such as I/O devices 40 and 45. In addition, the I/O hubs of FIG. 1 may be used to support various bus or other communication protocols of devices coupled thereto. IOH 20 and IOH 30 may act as agents to provide a central connection between two or more communication links. In particular, IOH 20 and IOH 30 may be referred to as "agents" that provide a connection between different I/O devices coupled to coherent system 15. In various embodiments, other components within coherent system 15 may also act as agents.

In various embodiments, each port of I/O hubs 20 and 30 may include a plurality of channels, often referred to herein as "virtual channels" that together may form one or more virtual networks and associated buffers to communicate data, control and status information between various devices. In one particular embodiment, each port may include up to at least six such channels, including a home (HOM) channel, a snoop (SNP) channel, a response (NDR) channel, a short message (NCS) channel, a data (NCB) channel and a data response (DR) channel, although the scope of the present invention is not so limited.

In other embodiments, additional or different virtual channels may be present in a desired protocol. Further, while discussed herein as being used within a coherent system, it is to be understood that other embodiments may be implemented in a non-coherent system to provide for deadlock-free routing of transactions. In some embodiments, the channels may keep traffic separated through various layers of the system, including, for example, physical, link, and routing layers, such that there are no dependencies.

Figure 2:
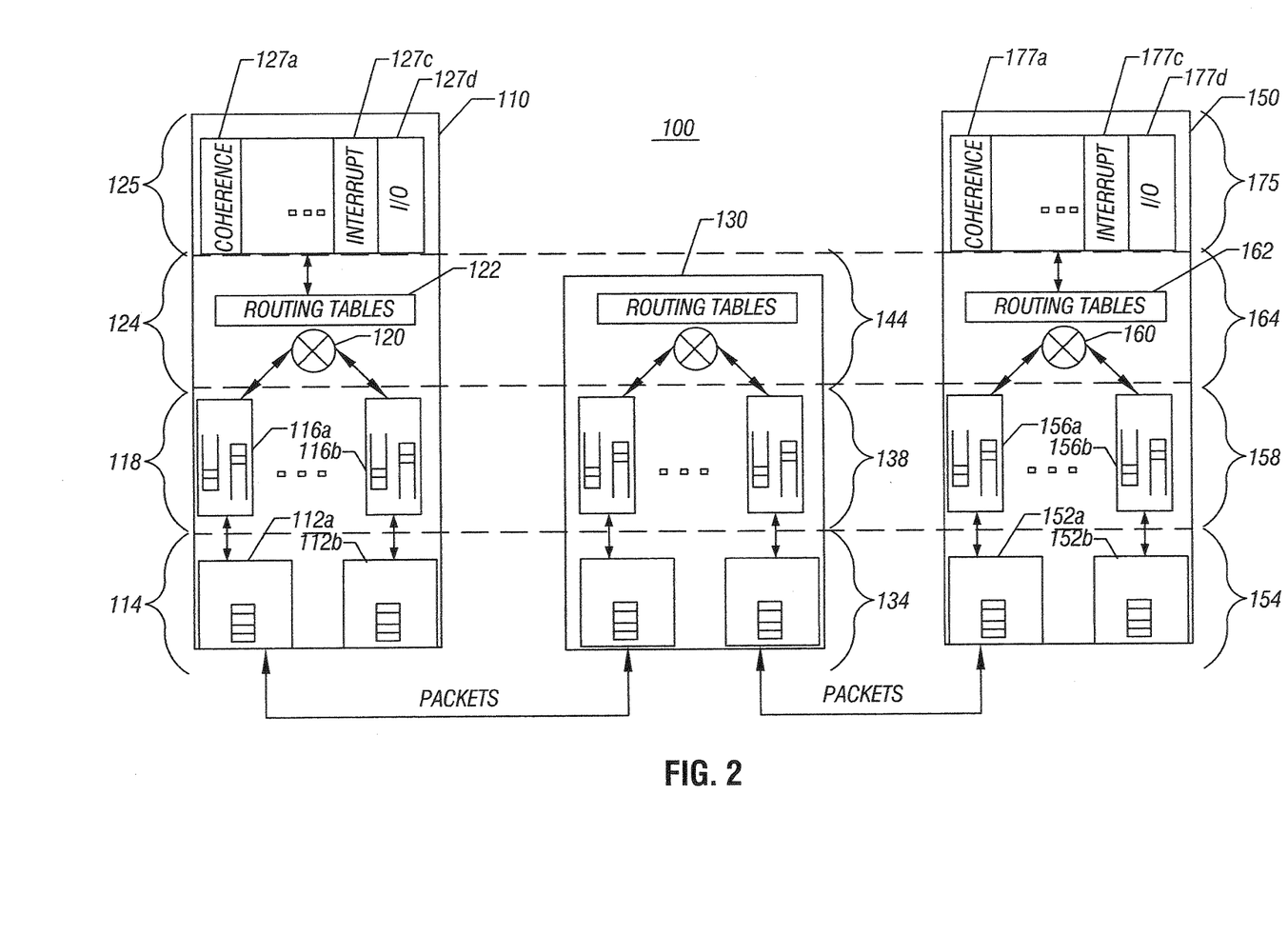
FIG. 2 is a block diagram of a portion of a coherent system in accordance with one embodiment of the present invention.

Referring now to FIG. 2, shown is a block diagram of a portion of a coherent system in accordance with one embodiment of the present invention. As shown in FIG. 2, system 100 includes a first agent 110, a second agent 150, and a bridging agent 130. In one embodiment, agents 110 and 150 may be I/O hubs, while bridging agent 130 may be a switching device. In other embodiments, the agents may be microprocessors, other bus agents and the like. Also while discussed in the embodiment of FIG. 2 as a coherent system, it is to be understood that the scope of the present invention is not so limited.

First agent 110 may include a plurality of layers, including a physical layer 114, a link layer 118, a routing layer 124 and a protocol layer 125. Packets may be received in first agent 110 at physical layer 114, which may include a plurality of electrical transfer ports 112a and 112b. In various embodiments, physical layer 114 may be used to provide electrical transfer of information between two directly connected coherent agents via a fabric. While shown as including two such ports in the embodiment of FIG. 2, it is to be understood that additional ports may be present in other embodiments.

Packets communicated between agents may include a header and associated information (e.g., a "payload"). The packets are then forwarded to link layer 118, which may include a plurality of buffer flow control mechanisms. Shown in the embodiment of FIG. 2 are two buffer flow control mechanisms 116a and 116b, each of which may include an incoming buffer and an outgoing buffer. While not shown in FIG. 2, flow control mechanisms 116a and 116b may also include various counters and control logic to implement credit-based flow control.

Link layer 118, in various embodiments, may be used to provide reliable data transfer and flow control between two directly connected coherent agents, and also to virtualize a physical channel between the devices. Link layer 118 may be flow controlled to prevent overflow or underflow, and may also provide error detection and recovery. In certain embodiments, flow control may be implemented using packet-based and/or flit-based level credit/debit flow control. A flit may refer to a smallest unit of data transfer which, in one embodiment, may be 80 bits long. A packet corresponds to a logical grouping of one or more flits. In certain embodiments, a packet may be the smallest unit of information that includes routing and other information via a header. Each packet may contain a header and an optional data field. In certain embodiments, the header may be one to two flits long, and a data portion may extend to a cacheline size of the coherent system. In various embodiments, link layer 118 may virtualize a physical channel into multiple message classes and virtual networks. In such manner, a physical channel may be multiplexed among multiple virtual channels.

When flits are properly received, link layer 118 may provide the flits to routing layer 124. In various embodiments, routing layer 124 may provide a flexible and distributed manner of routing coherent packets from source to destination. The destination-based routing may be determined using routing tables within routing layer 124, which allows for adaptive routing and on-line reconfiguration of the routing tables. In one embodiment, a header generated by a transaction layer may include information that identifies a destination, an input port and a virtual network, and these values may be input into a routing table to determine the desired output port and the virtual network on which the transaction may flow. In various embodiments, routing tables may be stored in protected configuration space and programmed by firmware. Such routing tables may be programmed to enable deadlock-free routing for various topologies. Such destination-based routing may be based on a node identifier (node ID), which uniquely identifies an agent within the coherent system. Thus flits received from link layer 118 may be multiplexed in routing layer 124 through a switch 120 and provided to routing tables 122, which use, for example, a destination node ID field value to route the associated header and payload (if present) to the proper agent. If a packet is destined for agent 110, routing tables 122 will provide the packet to protocol layer 125. Alternately, if the packet is destined for another destination, the header and packet will be sent back through link layer 118 and physical layer 114 of agent 110 to a different agent.

In one embodiment, a protocol layer 125 (also referred to as a "transaction layer") may include various protocol engines to form, order, and process packets for transmission through a coherent system. For example, in one embodiment, transaction layer 125 may include a coherence engine 127a, an interrupt engine 127C, and an I/O engine 127d, among others. Using such engines, transaction layer 125 may form a packet having a common system header (also referred to as a "system interconnect header"). The packets thus formed in transaction layer 125 may be provided to routing layer 124 on a given virtual channel.

In various embodiments of the present invention, protocol layer 125 may use a transaction ID associated with the header to order a transaction and perform desired processing thereon using various engines within protocol layer 125. Shown as representative engines in the embodiment of FIG. 2 are a coherence engine 127a, an interrupt engine 127c, and an I/O engine 127d.

Similar functionality may be present in second agent 150, which includes a corresponding physical layer 154, link layer 158, routing layer 164, and protocol layer 175. As further shown in FIG. 2, each of these layers may include components similar to those of agent 110, including, for example, electrical transfer units 152a and 152b, buffer flow control mechanisms 156a and 156b, switch 160, routing tables 162, and protocol engines 177a, 177c, and 177d.

Further shown in FIG. 2, a bridging agent 130 may include corresponding physical, link, and routing layers (respectively, physical layer 134, link layer 138, and routing layer 144). In certain embodiments, bridging agent 130 may be a switch, bridge, hub, or the like, and may be used to provide a bridge between a different set of agents or nodes of coherent system 100. For example, in another embodiment, bridging agent 130 may be coupled to a first plurality of processors (e.g., on a left hand side) and a second plurality of processors (e.g., on a right hand side).

In various embodiments of the present invention to improve packet transmission, flits of one packet may be interleaved amongst flits of a different packet. Typically, interleaving in accordance with an embodiment of the present invention may be performed if a current packet being transmitted is a large packet, e.g., a data packet including many flits. Such flits are typically contiguously sent from a transmitter and received by a receiver. However, it may be desirable to transmit a relatively small packet (e.g., a packet with only one or a few flits) amongst the flits of this larger packet. To do so, an interleave indicator within the packet communication may be sent from sender to receiver to indicate presence of the interleaved packet. In some embodiments, interleaving may occur only during transmission of large packets. That is, interleaving of one small packet into transmission of another small packet may not be permitted, in some embodiments.

As several examples, insertion of a command or a special packet may occur during transmission of a current data packet or a data packet may be inserted into another data packet. The command packet may be a protocol message or a link layer message, in some embodiments. Typically, a command packet is sent to completion, and then the original packet may continue transmission. However, in some embodiments another interleaved packet may be transmitted contiguously after the first interleaved packet by setting of the interleave indicator for the new interleaved packet.

In yet other embodiments, two data packets may be interleaved so that two data streams are interleaved in a scheduled manner. In this manner, a minimum latency can be achieved when a sender can ready two streams at the same time.

Figure 3:
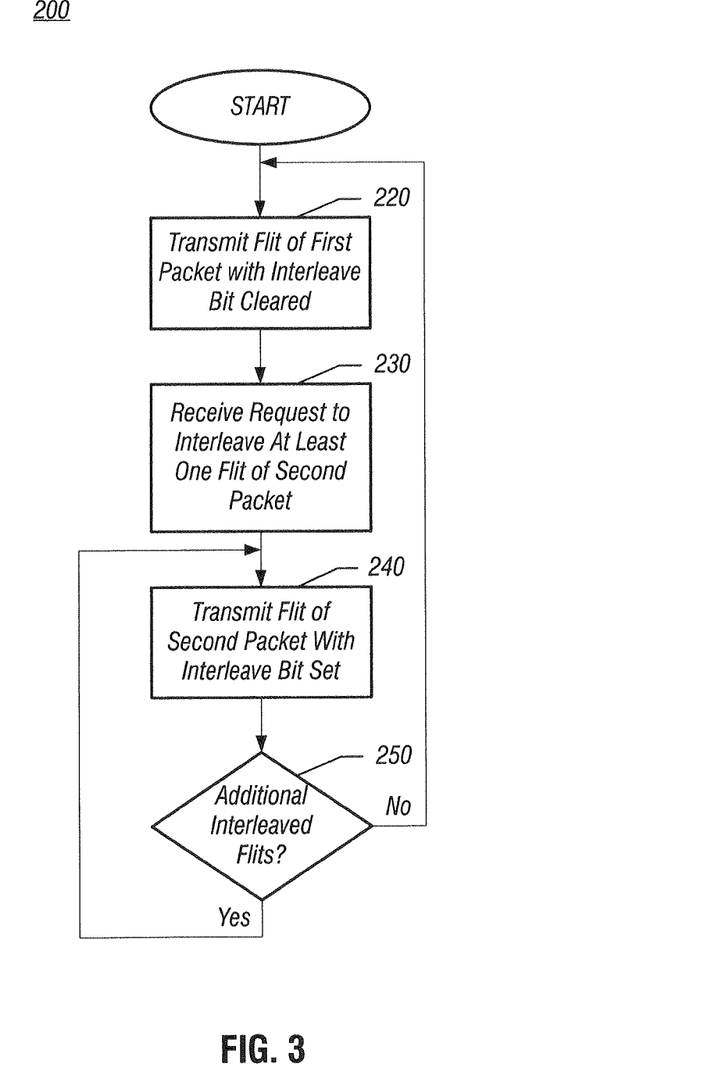
FIG. 3 is a flow diagram of a method of transmitting packets in accordance with one embodiment of the present invention

Referring now to FIG. 3, shown is a flow diagram of a method in accordance with one embodiment of the present invention. Specifically, method 200 may be used to transmit packets in accordance with an embodiment of the present invention. As shown in FIG. 3, method 200 may begin by transmitting a flit of a first packet with its interleave bit cleared (block 220). As an example, a sending endpoint may transmit a first flit of the first packet to a requesting device such as a receiving endpoint. Because the interleave bit is cleared, the flit is part of the packet that is currently being transmitted, i.e., the first packet. In certain implementations, however, the interleaved bit may be set in the first flit, e.g., a header portion, of every packet transmitted. In such implementations, the interleave indicator may also be used for debug purposes, for example, to denote the start of a packet. While not shown in the embodiment of FIG. 3, it is to be understood that transmission of flits of a first packet may continue for the duration of the packet unless a request for interleaving is received.

During packet transmission, if interleaving is desired, the sending endpoint may receive a request to interleave at least one flit of an interleaved packet (block 230). For example, such a request may come from the sending endpoint itself. Interleaving may be used to rapidly send a short message, such as a command or status information or other special packet, during transmission of a longer message, such as data transmission. When an interleave request is received, the sending endpoint may transmit a flit of the interleaved packet. More specifically, the interleaved packet's flit may be sent with its interleave bit set (block 240). Beyond this interleave bit, no other information is sent to signify either a beginning or end of an interleave, nor on which channel the interleave is to occur. However, the packet header of the new packet may indicate a length of the new packet, as well as the new virtual channel on which the packet is sent. That is, in various embodiments an interleaved packet is sent on a different virtual channel than the packet currently being sent. As will be described further below, via the interleave indicator (i.e., the interleave bit), the receiving endpoint may determine that it has received an interleaved flit and process the packet including the interleaved flit (i.e., the second packet) accordingly.

Next it may be determined whether an additional interleaved flit of this interleaved packet is to be sent from the sending endpoint (diamond 250). If not, control passes to diamond 258. There it may be determined whether an additional interleaved packet is desired to be transmitted. If not, control returns to block 220 where a next flit of the first packet may be sent (block 220). As described above, this flit may be sent with its interleave bit cleared. If instead at diamond 258 it is determined that an additional interleaved packet is desired to be sent, control passes back to block 240, discussed above.

If instead at diamond 250 it is determined that an additional interleaved flit of the first interleaved packet is to be sent, control passes to block 255. There, the additional interleaved flit may be transmitted (block 255). In various embodiments, this additional interleaved flit may be sent with its interleave indicator cleared, indicating that the flit is part of the interleaved packet. From block 255, control passes back to diamond 250, discussed above.

As described above in various implementations, interleaving may occur only if a currently transmitting packet is of a particular size. Accordingly, prior to permitting an interleave operation, it may first be determined whether the currently transmitting packet is of a size is at least equal to a predetermined threshold. While such a threshold may vary in different embodiments, in some embodiments an interleaved packet may be at least longer than a remaining portion of the non-interleaved packet for interleaving to occur. While shown with these particular operations in the embodiment of FIG. 3, it is to be understood the scope of the present invention is not so limited. That is, in other embodiments interleaving of packets may occur in different manners. In these embodiments, an interleave indicator, such as an interleave bit that is part of each flit to be transmitted, may be used to determine whether interleaves are occurring and if so to appropriately handle flits of such interleaved packets.

Accordingly flexible message transmission may be effected, as flits of different packets can be interleaved within one or more virtual channels for transmission between endpoints. Furthermore, the interleaved flits of different packets may be sent on multiple channels within one or more virtual networks.

Figure 4:
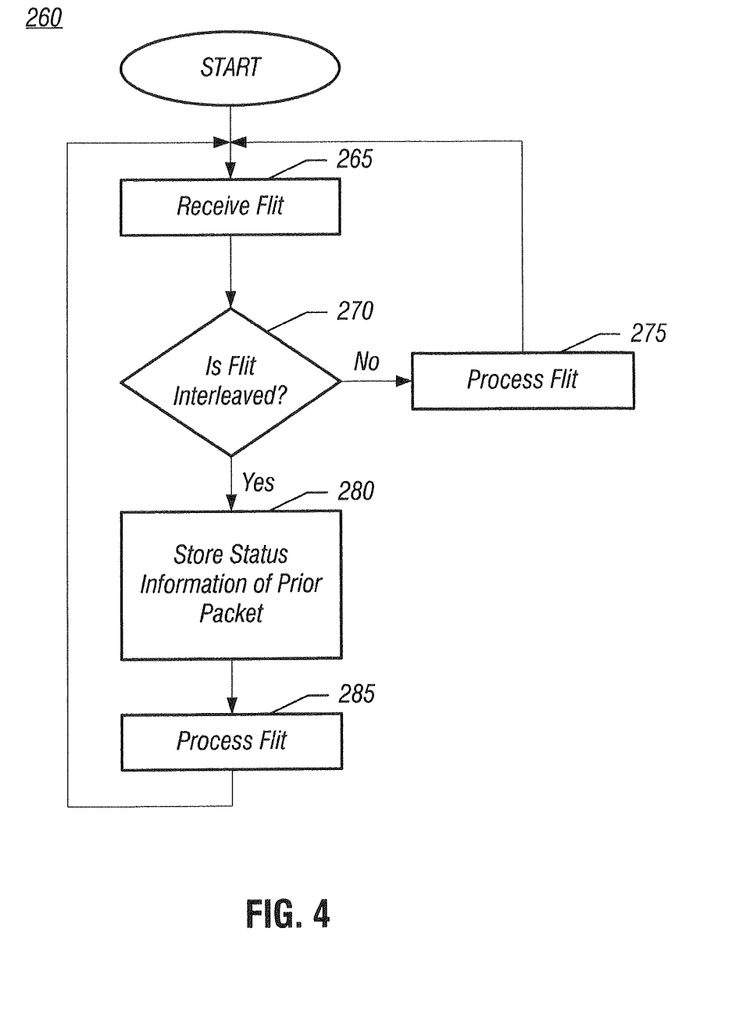
FIG. 4 is a flow diagram of a method of receiving interleaved packets in accordance with an embodiment of the present invention.

Referring now to FIG. 4, shown is a flow diagram of a method of receiving interleaved flits in accordance with an embodiment of the present invention. As shown in FIG. 4, method 260 may be used to perform receive operations in a receiving endpoint, for example. Method 260 may begin by receiving a flit (block 265). The flit may be received by a receiving endpoint, which then may determine whether the flit has been interleaved into a previous packet (diamond 270). In various embodiments, this determination may be made by checking an interleave indicator sent as part of the flit. For example, an interleave bit may be set to indicate that the corresponding flit is an interleaved flit, while a cleared interleave bit may indicate a non-interleaved flit. In some implementations, one or more packets may thus be nested within a first packet, and further, double nesting of packets may occur.

If it has been determined that the flit is not interleaved, control may pass to block 275. There, the flit may be processed. As an example, the receiving endpoint may store a payload portion of the flit in a buffer corresponding to the packet of which the flit is a part. For example, the flit may be stored in a buffer associated with the virtual channel on which the flit was received. For example, a data buffer may be associated with data packets, which are generally not sent via interleaving. Furthermore, status information corresponding to the packet, which may be obtained from a header of the packet, may be stored in a current packet status storage of the receiving endpoint. As an example, this storage may include a current virtual channel indicator storage and a packet length storage. The current virtual channel indicator storage may store an indication of the virtual channel on which the flit was received, while the packet length storage may store an indication of the current packet's length (e.g., in flits). Upon processing the current flit, control may pass from block 275 to block 265 for reception of a next flit, which may or may not be part of the same packet.

If instead at diamond 270 it is determined that the currently received flit is part of an interleaved packet, control passes to block 280. There, status information of the prior packet may be stored (block 280). More specifically, if the prior packet had a flit length greater than the amount of received flits for the packet, status information that was previously stored in the current status storage of the receiving endpoint may be transferred to a prior status storage of the receiving endpoint.

In such manner, the prior packet, including payload flits and information corresponding to the packet (e.g., virtual channel and packet length), may be placed aside to allow the receiver to process the interleaved flit (block 285). In various embodiments, this flit processing may be performed as discussed above regarding a non-interleaved flit. However, the packet data, which may be a command, may be stored in a different buffer. That is, interleaved packets are typically sent on a different virtual channel than the packet in which it is interleaved. Accordingly, payload data of the interleaved flits may be stored in a buffer associated with the new virtual channel. For example, such a buffer may correspond to a command buffer with which interleaved packets are associated. Upon completion of processing, control may return to block 265 for receipt of a next flit, which again may be a interleaved or non-interleaved flit. In some implementations, one or more packets may thus be nested within a first packet, and further, double nesting of packets may occur.

Figure 5:
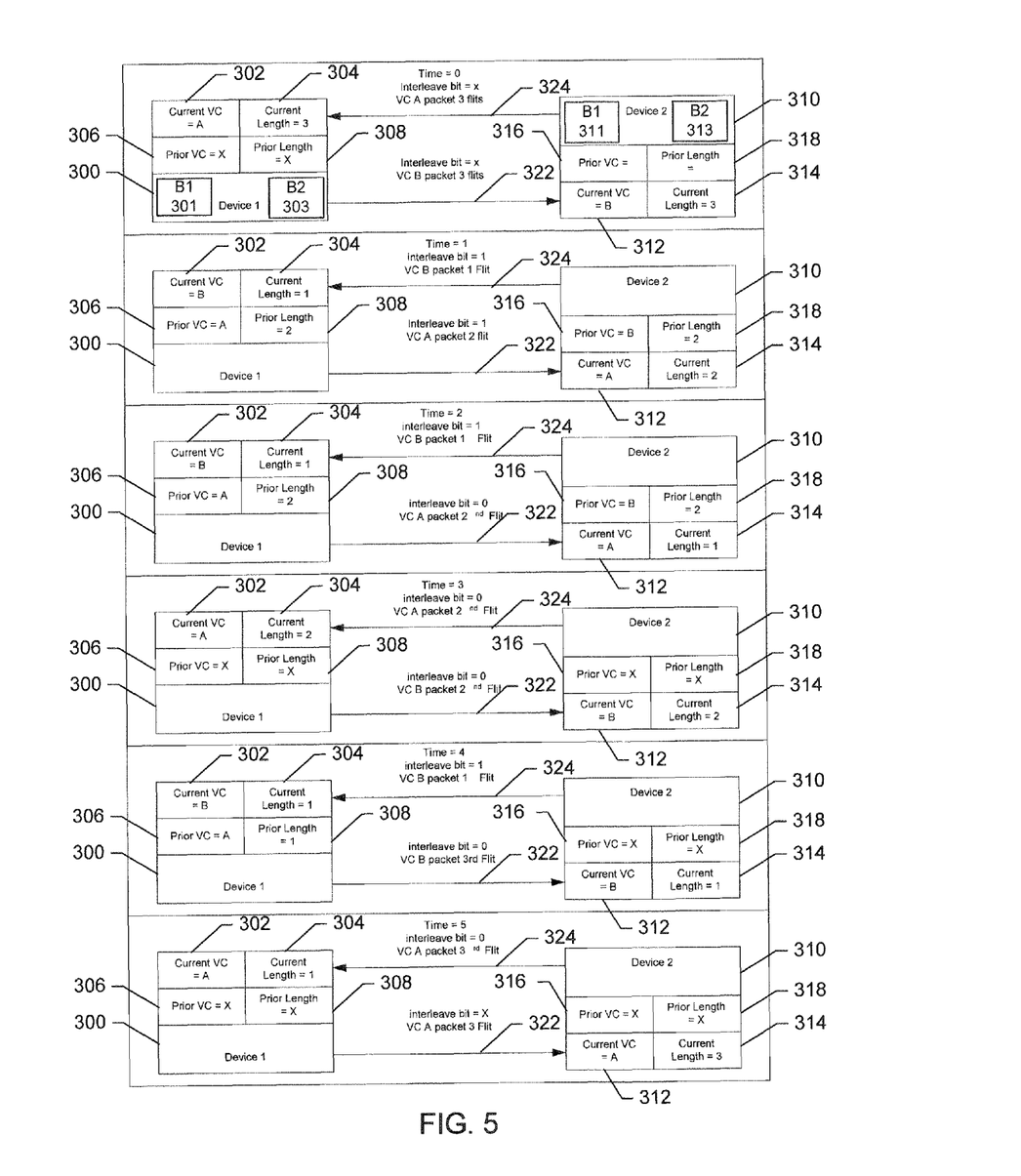
FIG. 5 is a timing diagram showing interleave operations in accordance with an embodiment of the present invention.

Referring now to FIG. 5, shown is a timing diagram showing interleave operations in accordance with an embodiment of the present invention. As shown in FIG. 5, a first endpoint 300, which may be a I/O device, processor, hub agent or other such device, is shown coupled to a second endpoint 310, which may also be a similar type of agent. Endpoints 300 and 310 may be coupled by a plurality of interconnects, including interconnects 322 and 324, which may be point-to-point interconnects, although the scope of the present invention is not so limited. As shown in FIG. 5, first endpoint 300 may include various status storages to store information regarding current and previous packets for which data is received by endpoint 300. Specifically, as shown in the embodiment of FIG. 5, first endpoint 300 may include a current virtual channel status storage 302, a current length status storage 304, a prior virtual channel status storage 306, and a prior length status storage 308. Similarly, endpoint 310 may include status storages to store information regarding packets it receives. These storages may include a current virtual channel status storage 312, a current length status storage 314, a prior virtual channel status storage 316, and a prior length status storage 318. While shown as maintaining status information regarding these particular parameters, additional status storages may be present in other embodiments to store additional information regarding current and prior packets received by an agent. Furthermore, multiple independent status storages may be provided for different virtual channels and/or virtual networks, as desired for a particular implementation.

While not shown in the embodiment of FIG. 5, endpoints such as first endpoint 300 and second endpoint 310 may include a plurality of buffers to buffer both incoming and outgoing data. In various embodiments, at least two incoming buffers (e.g., of different virtual channels) may be present, one of which is used to buffer data packets, and the second of which is used to buffer command or other interleaved packets. However, additional buffers may be present in other embodiments.

FIG. 5 shows an example usage of an interleaving protocol in accordance with an embodiment of the present invention. The various time instances shown in FIG. 5 are shown chronologically. However, it is to be understood that the time indications do not necessarily correspond to bus cycles or any other defined time periods.

As shown in FIG. 5, at a time zero, first agent 300 receives a packet on a virtual channel A having a three-flit length. Accordingly, current virtual channel status storage 302 is set equal to A, and current length status storage 304 is set to a length of three. Furthermore, second agent 310 receives a packet on a virtual channel B, also having a three-flit length. Accordingly, current virtual channel status storage 312 is set to a value of B, and current length status storage 314 is also set to a length of three. Because both of these packets are sent with an interleave bit value of X (i.e., a don't care), no prior packet storage information is maintained.

At a next time, time one, first agent 300 receives a one-flit packet on virtual channel B having its interleave bit set. Accordingly, the status information previously stored in current status storages 302 and 304 is moved to prior status storages 306 and 308, and the current packet information (i.e., current virtual channel B having a current length of one) is stored in current status storages 302 and 304. Similarly, second agent 310 receives a two-flit length packet on virtual channel A having its interleave bit set. Accordingly, status information previously stored in current status storages 312 and 314 is moved to prior status storages 316 and 318, and the current status information is placed in current status storages 312 and 314. Note that at time one, prior length status storage 318 has a length of two corresponding to the prior three-flit packet sent, decremented by one flit for the previously received flit.

At a next time two, first agent 300 again receives a one-flit length packet on virtual channel B having its interleave bit set. This interleaved flit is thus of a new interleaved packet, and the status information stored in first agent 300 thus remains the same. Also at time two, second agent 310 receives a second flit of the interleaved packet on virtual channel A having its interleave bit set to zero. Note that the interleave bit of this packet is zero, indicating it is part of the interleaved packet initiated at time one. Accordingly, the only status information that is changed in second agent 310 is that current length status storage 314 is decremented to a value of one.

At a next time three, first agent 300 receives a second flit of the original packet on virtual channel A having its interleave bit cleared. Accordingly, the prior status information previously stored in prior status storages 306 and 308 is moved into current status storages 302 and 304 (and the current length information is updated accordingly). Similarly, second agent 310 receives a second flit of its original packet on virtual channel B having its interleave bit cleared. Accordingly, its status storage information is manipulated in the same manner.

At time four, first agent 300 receives a one-flit packet on virtual channel B having its interleave bit set. Accordingly, the status information that was stored in current status storages 302 and 304 is moved to prior status storages 306 and 308 (note that the length information of status storage 308 has been updated accordingly), and the current status information is placed into current status storages 302 and 304. Also at time four, second agent 310 receives a third flit of its original packet on virtual channel B having its interleave bit cleared. Accordingly, current length status storage 314 is updated accordingly in second agent 310.

Still referring to FIG. 5, next at time five, first agent 300 receives a third flit of its original packet on virtual channel A having its interleave bit cleared. Accordingly the status information previously stored in prior status storages 306 and 308 is moved into current status storages 302 and 304. Also at time five, second agent 310 receives a first flit of a three-flit packet on virtual channel A having a don't care interleave bit value. Accordingly, current status storages 312 and 314 of second agent 310 are set accordingly.

While shown with this example sequence in FIG. 5, it is to be understood that additional status storages and operations may be performed at various times and between different devices using embodiments of the present invention.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a first buffer to store data of a first packet received in the processor from a second agent coupled to the processor;
a first status storage to store information regarding the first packet;
a second buffer to store data of a second packet received in the processor from the second agent;
a second status storage to store information regarding at least one of the first packet and the second packet; and
a controller to analyze an interleave indicator within an incoming packet portion and to store data of the incoming packet portion in the second buffer if the interleave indicator is indicative that the incoming packet portion is of an interleave packet that is interleaved within the first packet, and to control the first status storage to store information of the second packet and to control the second status storage to store information of the first packet, based on the interleave indicator.

2. The processor of claim 1, wherein the controller is to store the information regarding the first packet in the second status storage if the incoming packet portion is part of the second packet.

3. The processor of claim 2, wherein the controller is to retrieve the information regarding the first packet from the second status storage if a later incoming packet portion is part of the first packet.

4. The processor of claim 1, wherein the processor comprises a transaction layer, a link layer and a physical layer, and wherein the first buffer, the second buffer and the controller are associated with the link layer.

5. The processor of claim 1, wherein the processor is coupled to the second agent via a point-to-point interconnect.

6. The processor of claim 5, wherein the incoming packet portion comprises command information and is part of the second packet, wherein the first packet comprises a data packet.

7. The processor of claim 1, wherein the first packet is a data packet and the second packet is a command packet.

8. The processor of claim 1, wherein the second packet is communicated on a first virtual channel and the first packet is communicated on a second virtual channel.

9. The processor of claim 1, wherein the second packet is a single flit.

10. The processor of claim 1, wherein the controller is to process the second packet nested in the first packet.

11. The processor of claim 1, wherein the controller is to process the second packet nested in the first packet, and to process a third packet nested in the first packet.

12. A method comprising:
transmitting a first portion of a first packet from a first endpoint of a system, the first portion including an interleave indicator value corresponding to a non-interleaved status;
transmitting a second portion of a second packet from the first endpoint when a size of the first packet is greater than a threshold and otherwise not transmitting the second portion of the second packet, the second portion including an interleave indicator value corresponding to an interleaved status;
receiving a first portion of a third packet in the first endpoint;
storing status information of the third packet in a current packet status storage of the first endpoint;
receiving a first portion of a fourth packet in the first endpoint; and
storing the status information of the third packet in a prior packet status storage of the first endpoint and storing status information of the fourth packet in the current packet status storage of the first endpoint responsive to an interleave indicator of the fourth packet that indicates that the fourth packet is interleaved during transmission of the third packet.

13. The method of claim 12, further comprising transmitting the second portion of the second packet, wherein the second portion includes a virtual channel indicator and a packet length for the second packet.

14. The method of claim 13, further comprising transmitting another portion of the first packet upon completion of transmission of the second packet.

15. A system comprising:
- a first endpoint to receive packets via a point-to-point interconnect from a second endpoint, the first endpoint including a link layer, the link layer having:
  - a current packet status storage to store status information of a current packet; and
  - a prior packet status storage to store status information of a previous packet, wherein the link layer is to determine responsive to an interleave indicator of a received packet portion that indicates that the received packet portion is interleaved during transmission of the current packet and to control the current packet status storage to store status information of the received packet portion and the prior packet status storage to store the status information of the current packet based thereon; and
- a dynamic random access memory (DRAM) coupled to the first endpoint.

16. The system of claim 15, wherein the link layer further comprises:
- a first buffer to store data of the current packet; and
- a second buffer to store data of the previous packet.

17. The system of claim 16, wherein the first buffer is associated with a first virtual channel and the second buffer is associated with a second virtual channel.

18. The system of claim 16, wherein the first endpoint is to receive the received packet portion on a first virtual channel if the interleave indicator has a first value and on a second virtual channel if the interleave indicator has a second value.

19. The system of claim 16, wherein the current packet status storage includes a channel indicator storage and a packet length indicator storage.

20. The system of claim 16, further comprising a second endpoint to transmit the packets, the second endpoint coupled to the first endpoint via a point-to-point interconnect, the first endpoint and the second endpoint comprising agents of a coherent system.

* * * * *